May 21, 1935.  B. E. LENEHAN  2,001,914
NON SELF STARTING CLOCK MOTOR
Filed Oct. 21, 1931   2 Sheets-Sheet 1
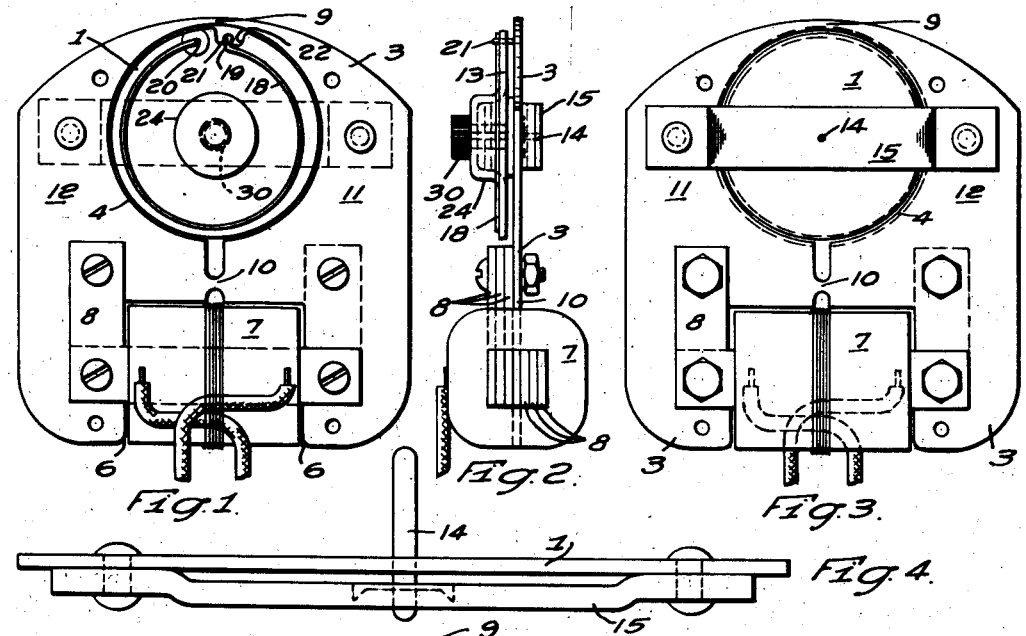
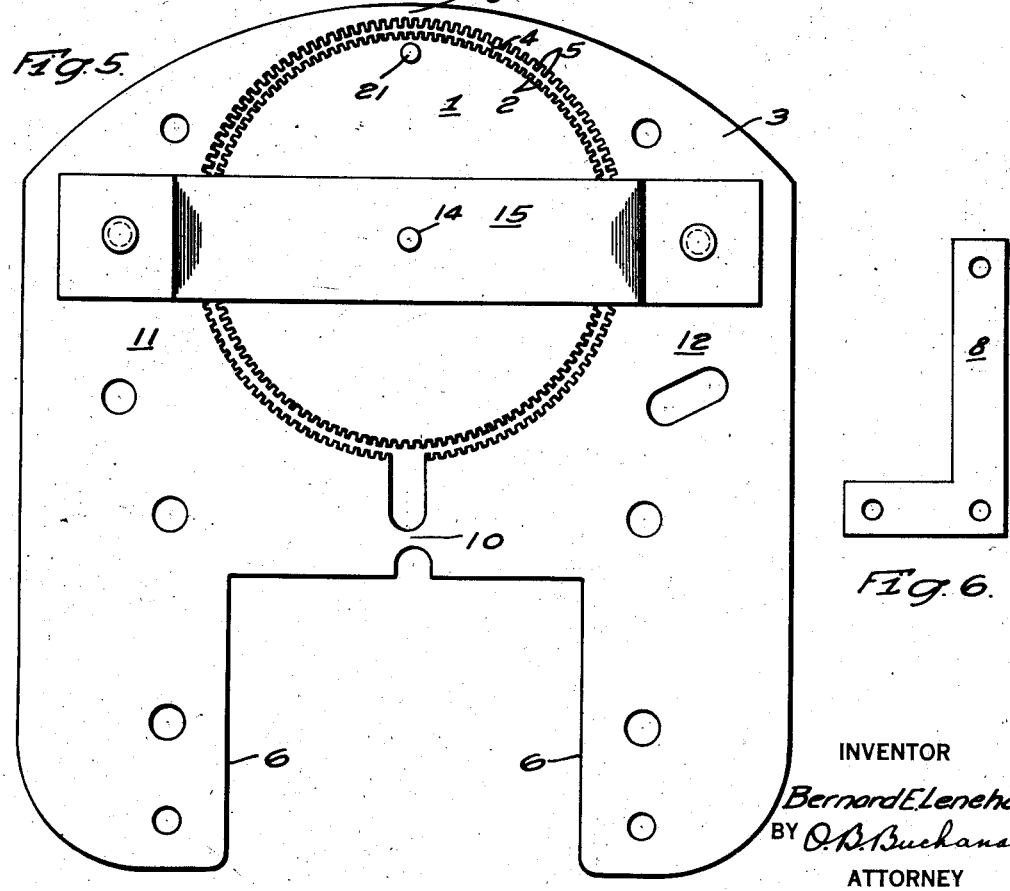
INVENTOR
Bernard E. Lenehan
BY O. B. Buchanan
ATTORNEY May 21, 1935. B. E. LENEHAN 2,001,914

NON SELF STARTING CLOCK MOTOR

Filed Oct. 21, 1931 2 Sheets-Sheet 2

WITNESSES:
B. A. M'Closkey
Thur. C. Groome

INVENTOR
Bernard E. Lenehan
BY O. B. Buchanan
ATTORNEY

Patented May 21, 1935

2,001,914

UNITED STATES PATENT OFFICE 2,001,914

NON-SELF-STARTING CLOCK-MOTOR

Bernard E. Lenehan, Bloomfield, N. J., assignor to Westinghouse Electric & Manufacturing Company, a corporation of Pennsylvania Application October 21, 1931, Serial No. 570,092

22 Claims. (Cl. 172—275)

My invention relates to synchronous motors and it has particular relation to non-self starting, slow-speed synchronous motors of the toothed-wheel type, driving a load consisting of a reduction gear train, as in clocks and similar devices.

The object of my invention is to provide a construction which is sound from an engineering and production standpoint. In particular, I utilize a single integral stator punching having saturated iron sections of small size to maintain the alignment of the two poles; I utilize an extra-thick bundle of L-shaped punchings for the core of the stator coil, the extra thickness of which reduces the flux densities in the vicinities of the ends of the coil and thus materially reduces the humming of the iron; I utilize a stationary pin-bearing which is so designed that a pin may be easily located concentrically in the stator ring by a simple jig, thereby avoiding the troubles incident to eccentricity in either the stator or the rotor; I utilize a novel oil-storing lubricating system which is combined with the flywheel and the driving pinion; and I utilize a novel damping system comprising a non-oscillary fly-wheel which is driven from the rotor by means of a spring, with some bearing friction therebetween, the load being driven from the flywheel.

In the drawings,

Figure 1 is a full-scale front elevation of a motor constructed in accordance with my invention.

Figs. 2 and 3 are side and rear elevations, respectively, of the same motor.

Fig. 4 is a double-scale top plan view of the stator member, with the coil and the L-shaped coil laminations removed.

Fig. 5 is a double-scale rear elevation of the motor, showing details of the stator and rotor teeth, the coil and the L-shaped core laminations being removed.

Fig. 6 is an elevation of one of the L-shaped core laminations.

Figure 7:
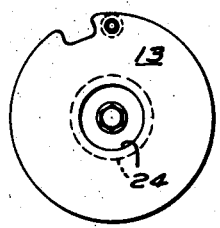
Fig. 7 is a rear elevation of the flywheel by itself.
Figure 8:
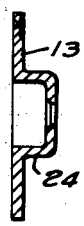
Fig. 8 is a sectional view of the same.

The embodiment of my invention illustrated in the drawings is a two-pole single-phase, non-starting synchronous clock-motor of the toothed-wheel reaction-motor type. The rotor consists of a single circular iron disk 1 which is provided, around its periphery, with 120 equally spaced teeth 2. The stator polar member consists of a single large lamination 3 which is bored, as indicated at 4, to receive the rotor motor with a small air gap between the stator and the rotor, the bore being provided with teeth 5 having the same angular pitch as the rotor teeth. The bottom portion of the stator lamination 3 is notched to provide an opening 6 for receiving the coil 7, which is held in place by two thick bundles of L-shaped core-laminations 8 which are threaded through the coil and then bolted to the large stator lamination 3. This provides an easy assembly and a region of low flux density at the ends of the core, which very materially reduces the noise of the motor.

The large stator lamination is made in one integral piece, with material surrounding the entire periphery of the rotor. Two diametrically opposite sections of reduced area are provided, as indicated at 9 and 10, to join the two polar members 11 and 12 together, the reduced-section connecting-portions 9 and 10 being so small that they are saturated when the motor is energized, thus causing them to operate magnetically substantially as if they were not there. From a mechanical standpoint, however, the reduced sections 9 and 10 are important in preventing eccentricity of the stator poles, in holding the stator structure rigid so that its tiny teeth will line up satisfactorily with respect to the rotor teeth, rigid so that it will not vibrate or hum, and rigid so that the bore 4 may be easily and accurately cut, during the manufacturing process.

A motor such as has just been described operates synchronously at 60 revolutions per minute on a commercial 60-cycle power supply. Its action, when rotating synchronously, may be described as due to the condition that, on the peaks of the alternating-current wave, the teeth of the rotor are approaching the teeth of the stator, whereas, when the current is near zero, the teeth of the rotor are receding from the teeth of the stator. Consequently, the attraction is much greater when the teeth are approaching each other, and the rotation is sustained. The torque is seen to be of a pulsating character, having an average value which depends upon the phase position of the stator and rotor teeth with respect to the current.

The dependence of the torque upon the rotor phase-position produces a marked tendency to hunt, in such small motors, where the speed, and hence the flywheel-effect, is very small, and where the pull-out displacement of the rotor is one-quarter of a tooth pitch or 1/480 of 360°. It will thus be seen that an extremely slight alteration of the phase position of the rotor will produce an enormous change in the torque of the motor. If the motor is behind in phase, it is accelerated and rotates above synchronous speed in order to get to its normal position, but its inertia carries it past the normal position. Thus hunting is easily produced.

In order that the motor may run smoothly in step with the alternating flux, it is necessary that the pull-out torque shall not be exceeded under any condition, or, since torque is proportional to displacement, it is necessary that the displacement be kept within limits. The requirement is that, when an increased torque is suddenly required or released, the motor shall come to its new position of equilibrium without overswinging enough to cause pull-out.

A simple motor, such as has been described with reference to the drawing, that is, a motor without any spring and flywheel damper will be periodic or oscillation-proof, only if its load is at all times equal to, or greater than, a certain value, which is expressed mathematically by the equation $$R \geq 2\sqrt{\frac{L}{C}},$$

where R is the friction (C. G. S. units, expressed in terms of a unit radius) L is the moment of inertia of the rotor, and C is the displacement of the rotor per unit force. This does not work well in practice, because the friction R is somewhat variable, being, in general, very small, practically the same as the bearing friction of the rotor, which is the high-speed member of the reduction-gear train, but being subject to very considerable momentary variations, at times, due to the backlash of the gears, which may cause the backlash to be taken up in both directions, with the result that the motor-load may be reduced momentarily to zero or even reversed, and shortly thereafter it may be increased to considerably more than its normal value. The friction and load-resistance R of the motor may not safely be relied upon, therefore, to render the motor aperiodic so as to prevent it from hunting or oscillating out of step.

The foregoing difficulties are prevented, in my design, by the addition of a spring-connected flywheel 13. This flywheel conveniently has a diameter, thickness and weight commensurate with the rotor and it is rotatably mounted coaxially with the rotor but displaced longitudinally therefrom.

The rotor 1 is mounted on a stationary rotor-supporting pin 14 which is carried rigidly by a non-magnetic bridge 15 which spans the two-polar portions 11 and 12 of the stator lamination 3. The bridge is offset from the plane of the large stator lamination 3, as indicated in Fig. 4, so that it does not rub against the rotor member when the latter is in operation. This form of support for the rotor is very satisfactory from a production standpoint, because it is very easy to bore the hole for receiving the pin 14 in such a manner that it is exactly centered in the bore 4, and exactly at right angles to the face of the large stator lamination 3. The rotor member 1 is thus held very accurately in the center of the stator bore 4 at all times.

The flywheel 13 may be rotatably mounted directly on the pin 14, but I have had better success with it mounted on a tubular extension 16 of the rotor hub 17. This tubular extension 16 is journaled on the pin 14, thus providing a substantial bearing for the rotor member, and it also constitutes the member on which the flywheel 13 is rotatably supported.

The flywheel 13 is resiliently connected to the rotor 1 by means of a wire spring 18 having substantially one turn and having its ends 19 and 20 secured to the rotor and the flywheel respectively. Its end 19 is secured to a pin 21 which projects from the face of the rotor 1 and which extends through a hole or notch 22 in the flywheel. The spring-end 20 is bent over and soldered into a hole in the flywheel.

The flywheel 13 has a central offset portion 24 providing a hollow hub-space, in which is disposed a plurality of oil-soaked washers 25, of absorbent material, which hold enough oil to lubricate the motor throughout its life. It will be understood that only the smallest quantity of oil is necessary. Just before the parts are assembled, they are dipped in oil, and thereafter, the film of oil spreads out, from the absorbent washer 25, creeping over all of the rubbing surfaces. The creepage of the oil, beyond where it is needed, is prevented by grooves cut in the lateral surface of radially disposed members along which oil might creep and escape, as indicated at 26 in Fig. 14. The hub-space in which the absorbent washers 25 are disposed is closed by means of a metal washer 27, the bore 28 of which constitutes a bearing for the flywheel 13.

Figures 9, 10:
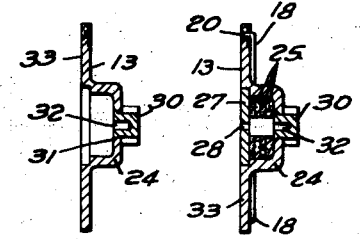
Fig. 9 is a similar sectional view of the flywheel with the pinion assembled in place.
Fig. 10 is a sectional view of the complete flywheel, with all of the parts which are attached thereto.
Figure 11:
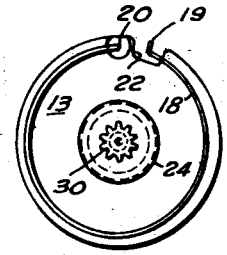
Fig. 11 is a front elevation of the same.
Figures 12, 13:
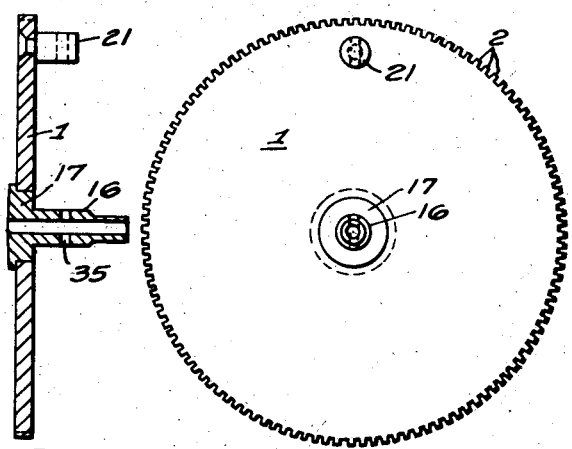
Figs. 12 and 13 are double-scale sectional and front elevational views of the rotor, with all the parts which are attached to it, except the spring.
Figure 14:
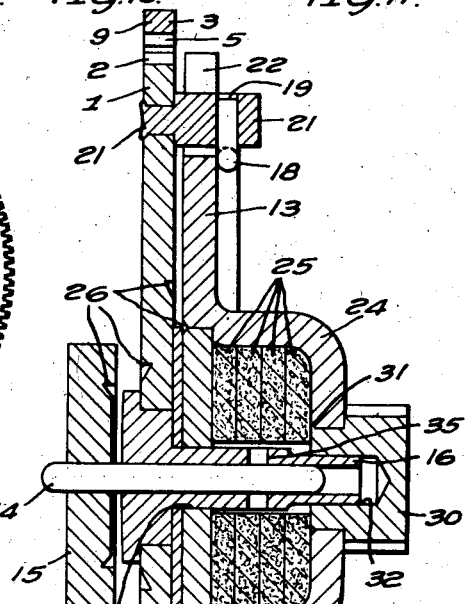
Fig. 14 is a sectional view of my assembled motor, enlarged four times, with the bottom part of the stator member cut away.
Figure 15:
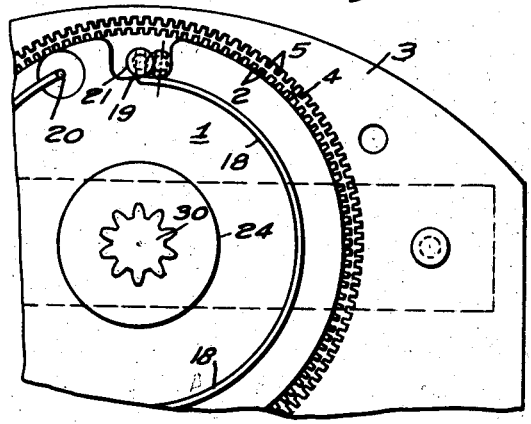
Fig. 15 is a double-scale view of the top portion of Fig. 1, showing, in dotted lines, the position of the spring post when the spring is exerting torque equal to the pull-out torque of the motor.

The flywheel member is completed by a pinion 30 which is first firmly united to the offset portion 24 of the flywheel, preferably by being ring staked in place, as indicated at 31 in Fig. 14. After the flywheel and pinion are assembled as shown in Fig. 9, a hole 32 is drilled exactly in the center of the aggregate, and at exactly right angles to the face 33 of the flywheel, to constitute a second bearing surface for the flywheel. The absorbent washers 25 are normally out of contact with the tubular rotor-extension 16 on which the flywheel aggregate is rotatably mounted.

The flywheel 13 is spaced from the rotor 1, to avoid unnecessary friction, as by means of a loose spacer or washer 34, the surfaces of which may be dished slightly (too slightly to be shown on the drawing) in order to restrict the area of the contacting surfaces.

The entire rotor assembly, including the rotor member 1 and the flywheel 13, with their associated parts, is mounted with some freedom of longitudinal movement on the pin 14. In normal operation, when the motor is excited, the pull of the magnetic flux centers the rotor with respect to the large stator lamination 3 so that the rotor aggregate is held at some intermediate longitudinal position on the shaft, thus avoiding thrust bearing friction.

The pinion 30 is adapted to be connected to a reduction gear mechanism of a clock-work (not shown), as has already been explained.

Considering the operation of the entire motor, with its spring-connected flywheel damper-mechanism just described, it will be evident that the flywheel 13 will tend to run at a uniform velocity. When the rotor 1 drops back in phase position, for any cause, the spring tension is lessened and the flywheel begins to slow down at the same time when the rotor is being accelerated. The rotor and flywheel thus drift apart until the spring tension is increased enough to pull them together. Thus the oscillation of the rotor is suppressed by using its energy to start an oscillation of the flywheel and spring.

The effect of the flywheel and spring aggregate, with its separation of the frictional load on the motor into two parts, (namely, the flywheel friction which is mechanically connected to the gearing load on the pinion, and the rotor friction which is separated from the former by the spring connection) is to impose an auxiliary equivalent resistance on the rotor oscillating system consisting of the rotor-inertia, the electrical torque and the frictional load on the motor. I thus avoid the condition of no-load operation, with its consequent evils, as discussed above. The electromechanical oscillating system is, therefore, damped, even at no load. The effect of a load will be to increase the damping and further stabilize the operation.

I prefer to utilize a spring 18 of such strength or stiffness that the flywheel must be deflected through approximately two tooth-pitches, or approximately twice the distance between the centers of two adjacent teeth, in order to pull-out the rotor 1 from its locked stationary position at standstill when the motor is energized at normal voltage. It is a characteristic of this toothed-wheel type of motor that the locking effect at starting, and hence the pull-out torque at starting, is equal to the pull-out torque under synchronous running conditions, so that the effect of the adjustment of the spring tension with respect to the locking action of the motor at standstill is equivalent to an adjustment of the spring-stiffness with respect to the actual pull-out torque under operating conditions. The rotor pulls out of step at a displacement of approximately one-quarter tooth pitch, so that the displacement of the spring, per unit force, is thus seen to be approximately eight times the displacement of the rotor per unit torque.

Since the moments of inertia of the rotor and the flywheel are approximately the same, and since the stiffness of the resilient force acting on the rotor is about eight times as much as the stiffness of the spring acting on the flywheel, the natural period of the spring and flywheel combination is $$\sqrt{8}$$

or approximately three times the natural period of the rotor. The spring and flywheel combination is partially damped, also, by reason of the load of friction and gearing thereon. Since the period of the flywheel is at least several times longer than that of the rotor, it is evident that the flywheel exerts a corresponding torque on the rotor for several cycles of its normal hunting or oscillation at its normal oscillating rate. The usual friction in the mounting of the parts, even when lubricated, will be sufficient to quickly damp the oscillation of the flywheel, and the load of the gearing helps also to damp these oscillations. The effect of the whole is to exert a strong steadying effect upon the rotor, causing its hunting oscillations to be quickly damped out.

While the effect of my spring flywheel damper is to prevent the free oscillation or hunting of the rotor, which is a very necessary function, particularly in a clock-motor operating as slowly as 60 R. P. M., my mechanism has also a function which has been obtained, in a different way, and without the full damping advantages of my combination, in previous synchronous motors, both large and small, namely facilitating the pulling-in of the motor into synchronism, at which time there must, in general, be a rather sudden change in the angular velocity of the rotor. My damping system allows synchronizing to be done by starting the motor at a speed above synchronous speed and allowing it to coast down into synchronism. I have used manual, spring and electromagnetic starters for this purpose. As the motor is decelerated towards synchronous speed, it must have enough inertia, as compared to its friction, so that it will pass through synchronism very slowly. Thus, it gets in the right phase position to keep going at synchronous speed at some time before it is too far away from synchronous speed to lock into step. If the entire mass of my rotor and flywheel were put in the rotor, without my spring coupling, the rotor would have too much inertia to enable it to jump into step easily. The spring permits the division of the inertia so as to have the benefit of the inertia during running conditions, without its drawback during the step of pulling into synchronism. It will thus be seen that my rotor has the advantage of other previous systems involving flywheels connected by a spring or friction, and it also has additional advantages in respect to the damping of oscillations in a slow-speed synchronous clock-motor.

In order to facilitate the lubrication of the bearing surface between the tubular extension 16 of the rotor and the pin 14, I preferably drill a hole 35 through this tubular extension so as to provide a shorter path for the creeping oil-film to reach the pin 14.

While I have described only one preferred embodiment of my invention, it will be obvious that many changes in detail may be made. I desire, therefore, that the appended claims be given the broadest construction commensurate with their language when read in the light of the prior art.

I claim as my invention:

1. A slow-speed, single-phase, synchronous motor of a type having teeth of identical tooth-pitches on the stator and the rotor, characterized by having a one-piece, two-pole magnetizable stator member having a multi-toothed bore for receiving the rotor, and having magnetically saturated reduced-section portions of said material at diametrically opposite sides of said bore for holding the alinement of the two polar halves of said material.

2. A slow-speed, single-phase, synchronous motor of a type having teeth of identical tooth-pitches on the stator and the rotor, characterized by the stator comprising a single large lamination of magnetizable material having a multi-toothed bore for receiving the rotor and an opening for receiving a coil, said large lamination having material completely surrounding the bore and having magnetically saturated reduced-section portions of said material at diametrically opposite sides of said bore for holding the alinement of the two polar halves of said material, a coil disposed within the opening therefor, and a plurality of separate core-laminations passing through said coil and secured to said large lamination.

3. A slow-speed, single-phase, synchronous motor comprising a rotor and a stator, the rotor being a single circular disk of magnetizable material having a large number of spaced teeth on its periphery, the stator having two co-planar polar portions each embracing substantially half of the rotor and having teeth spaced with a tooth pitch to cooperate with the rotor teeth, characterized by a diametrically disposed, non-magnetic bridge spanning the two polar portions and provided with a stationary rotor-supporting pin disposed centrally, the rotor having some freedom of longitudinal movement on said pin and being normally held in an intermediate longitudinal position by the attraction of the stator during the normal operation of the motor.

4. A slow-speed, single phase, synchronous motor comprising a rotor and a stator, the rotor being a single circular disk of magnetizable material having a large number of spaced teeth on its periphery, the stator having two co-planar polar portions each embracing substantially half of the rotor and having teeth spaced suitably for interlocking synchronously with the rotor teeth, characterized by a diametrically disposed, non-magnetic bridge spanning the two polar portions and provided with a stationary rotor-supporting pin disposed centrally, in combination with a flywheel of diameter, thickness and weight commensurate with the rotor and rotatably mounted coaxially therewith, but longitudinally displaced therefrom, a wire spring having substantially one turn and having its ends secured to the rotor and the flywheel, respectively, and a pinion carried by the flywheel.

5. The invention as defined in claim 4, characterized by said flywheel having an offset portion providing a hollow hub-space, lubricant-soaked washers of absorbent material in said hub-space, and a metal washer closing said hub-space and having a bore which constitutes a bearing for said flywheel.

6. The invention as defined in claim 4, characterized by said rotor having a hub having a tubular extension journaled on said pin and itself constituting the member on which the flywheel is rotatably supported.

7. The invention as defined in claim 4, characterized by said rotor having a hub having a tubular extension journaled on said pin and itself constituting the member on which the flywheel is rotatably supported, and further characterized by said flywheel having an offset portion providing a hollow hub-space, lubricant-soaked washers of absorbent material in said hub-space, and a metal washer closing said hub-space and having a bore which constitutes a bearing for said flywheel.

8. The invention as defined in claim 4, characterized by said spring having such stiffness that the flywheel must be deflected approximately twice the distance between the centers of two adjacent teeth in order to pull-out the rotor from its locked stationary position at standstill when the motor is energized at normal voltage.

9. A synchronous-motor drive-mechanism comprising, in combination with the motor-rotor, a stiff spring for transmitting the entire torque of the motor-rotor, the stiffness being such that the spring is deflected through an angle somewhere of the order of eight times as much as the angle of deflection of the motor-rotor at the pull-out torque of the motor under normal voltage conditions, a flywheel driven by said spring, and a substantially freely running spur reduction-gear driven by the flywheel and constituting a fluctuating load on the flywheel.

10. A small, substantially non-hunting, slow-speed synchronous motor of the toothed-wheel type, in which phase-angle swings of a minute angle corresponding to one-quarter of a tooth pitch must be avoided, in order to prevent loss of synchronism, comprising, in combination, a motor-stator and a motor-rotor having teeth adapted to lock together in synchronism, a flywheel, a spring for resiliently connecting said flywheel to the rotor to be driven thereby, said spring being of such stiffness that the natural period of the flywheel and spring is several times the natural period of the motor-rotor when the motor is operating at normal voltage, and a substantially freely running spur reduction-gear driven by the flywheel and constituting a fluctuating load on the flywheel.

11. A small, substantially non-hunting, slow-speed, single-phase synchronous motor of the toothed-wheel type, in which phase-angle swings of a minute angle corresponding to one-quarter of a tooth pitch must be avoided, in order to prevent loss of synchronism, comprising, in combination, a motor-stator and a motor-rotor having teeth adapted to lock together in synchronism, a stiff spring for transmitting the entire torque of the motor-rotor, the stiffness being such that the spring is deflected through an angle corresponding to approximately twice the distance between the centers of two adjacent teeth in order to pull-out the rotor from its locked stationary position at standstill when the motor is energized at normal voltage, a flywheel driven by said spring, and a substantially freely running, low-inertia reduction-gear load of widely fluctuating torque driven by the flywheel and constituting substantially the sole load on the motor.

12. A small, substantially non-hunting, slow-speed, single-phase, synchronous motor of the toothed-wheel type, in which phase-angle swings of a minute angle corresponding to one-quarter of a tooth pitch must be avoided, in order to prevent loss of synchronism, said motor being adapted to drive a low-inertia reduction-gear load of widely fluctuating torque, comprising, in combination, a motor-stator and a motor-rotor having teeth adapted to lock together in synchronism, and damping means, external of the rotor, for producing the effect of an artificial damping-load on the rotor for preventing such hunting, said damping means comprising a spring-flywheel aggregate interposed between the motor and its reduction-gear load, said spring-flywheel aggregate having little friction and having a natural period which is several times the natural period of the rotor of the motor when operating at normal voltage.

13. A slow-speed, single-phase, synchronous motor of the toothed-wheel type, comprising, in combination, a motor-stator and a motor-rotor having teeth adapted to lock together in synchronism at a speed much slower than the two-pole synchronous-motor speed, said motor-stator including, in its make-up, a single-phase coil and a one-piece, two-pole stator-lamination of magnetizable material having a multi-toothed bore for receiving the rotor and an opening for receiving the coil, and a separate core-lamination passing through said coil and secured to said two-pole stator-lamination, said two-pole stator-lamination having two toothed pole-face portions, each of nearly 180° extent, and each having its flux distributed substantially uniformly and freely across its entire extent, so that its teeth are substantially equally and simultaneously magnetized, said pole-face portions being in substantial phase-opposition to each other, being energized from opposite ends of said coil, characterized by said one-piece, two-pole stator-lamination comprising an integral magnetically saturated reduced-section portion joining said two pole-face portions.

14. A slow-speed, single-phase, synchronous motor comprising a rotor and a stator, the rotor comprising a circular disk of magnetizable material having a large number of spaced teeth on its periphery, the stator having two co-planar polar portions each embracing substantially half of the rotor and having teeth spaced with a tooth pitch to cooperate with the rotor teeth, whereby the stator and rotor teeth will lock together in synchronism at a speed much slower than the two-pole synchronous-motor speed, characterized by a diametrically disposed, non-magnetic bridge spanning the two polar portions and provided with a stationary rotor-supporting pin disposed centrally, the rotor having some freedom of longitudinal movement on said pin and being normally held in an intermediate longitudinal position by the attraction of the stator during the normal operation of the motor, a flywheel rotatably mounted coaxially with the rotor, but longitudinally displaced therefrom, a spring connection between the rotor and the flywheel, and means secured to the flywheel at the free end of the pin, whereby the motor torque is delivered to a device to be turned thereby.

15. A slow-speed, single-phase, synchronous motor comprising a rotor and a stator, the rotor comprising a circular disk of magnetizable material having a large number of spaced teeth on its periphery, the stator having two co-planar polar portions each embracing substantially half of the rotor and having teeth spaced with a tooth pitch to cooperate with the rotor teeth, whereby the stator and rotor teeth will lock together in synchronism at a speed much slower than the two-pole synchronous-motor speed, characterized by a diametrically disposed, non-magnetic bridge spanning the two polar portions and provided with a stationary rotor-supporting pin disposed centrally, a flywheel rotatably mounted coaxially with the rotor, but longitudinally displaced therefrom, a spring connection between the rotor and the flywheel, said flywheel having an offset portion providing a hollow hub-space, lubricant-soaked washers of absorbent material in said hub-space, and a metal washer closing said hub-space and having a bore which constitutes a bearing for said flywheel, and means secured to the flywheel at the free end of the pin, whereby the motor torque is delivered to a device to be turned thereby.

16. A slow-speed, single-phase, synchronous motor comprising a rotor and a stator, the rotor comprising a circular disk of magnetizable material having a large number of spaced teeth on its periphery, the stator having two co-planar polar portions each embracing substantially half of the rotor and having teeth spaced with a tooth pitch to cooperate with the rotor teeth, whereby the stator and rotor teeth will lock together in synchronism at a speed much slower than the two-pole synchronous-motor speed, characterized by a diametrically disposed, non-magnetic bridge spanning the two polar portions and provided with a stationary rotor-supporting pin disposed centrally, said rotor having a hub having a tubular extension journaled on said pin, a flywheel rotatably supported on said rotor-hub, a spring connection between the rotor and the flywheel, and means secured to the flywheel at the free end of the pin, whereby the motor torque is delivered to a device to be turned thereby.

17. A slow-speed, single-phase, synchronous motor comprising a rotor and a stator, the rotor comprising a circular disk of magnetizable material having a large number of spaced teeth on its periphery, the stator having two co-planar polar portions each embracing substantially half of the rotor and having teeth spaced with a tooth pitch to cooperate with the rotor teeth, whereby the stator and rotor teeth will lock together in synchronism at a speed much slower than the two-pole synchronous-motor speed, characterized by a diametrically disposed, non-magnetic bridge spanning the two polar portions and provided with a stationary rotor-supporting pin disposed centrally, said rotor having a hub having a tubular extension journaled on said pin, a flywheel rotatably supported on said rotor-hub, a spring connection between the rotor and the flywheel, said flywheel having an offset portion providing a hollow hub-space, lubricant-soaked washers of absorbent material in said hub-space, and a metal washer closing said hub-space and having a bore which constitutes a bearing for said flywheel, and means secured to the flywheel at the free end of the pin, whereby the motor torque is delivered to a device to be turned thereby.

18. A slow-speed, single-phase, synchronous motor comprising a rotor and a stator, the rotor comprising a circular disk of magnetizable material having a large number of spaced teeth on its periphery, the stator having two co-planar polar portions each embracing substantially half of the rotor and having teeth spaced with a tooth pitch to cooperate with the rotor teeth, whereby the stator and rotor teeth will lock together in synchronism at a speed much slower than the two-pole synchronous-motor speed, a stiff spring for transmitting the entire torque of the motor-rotor, the stiffness being such that the spring is deflected through an angle corresponding to approximately twice the distance between the centers of two adjacent teeth in order to pull-out the rotor from its locked stationary position at standstill when the motor is energized at normal voltage, a flywheel driven by said spring, said flywheel being rotatably mounted coaxially with the rotor, but longitudinally displaced therefrom, and means secured to the flywheel at the free end of the pin, whereby the motor torque is delivered to a device to be turned thereby.

19. A small, substantially non-hunting, slow-speed synchronous motor of the toothed-wheel type, in which phase-angle swings of a minute angle corresponding to one-quarter of a tooth pitch must be avoided, in order to prevent loss of synchronism, comprising, in combination, a motor-stator and a motor-rotor having teeth adapted to lock together in synchronism, a flywheel, spring means for resiliently connecting said flywheel to said rotor, said flywheel having an offset portion providing a hollow hub-space, lubricant-soaked washers of absorbent material in said hub-space, and a metal washer closing said hub-space and having a bore which constitutes a bearing for said flywheel, and means secured to the flywheel whereby the motor torque is delivered to a device to be turned thereby.

20. A small, substantially non-hunting, slow-speed synchronous motor of the toothed-wheel type, in which phase-angle swings of a minute angle corresponding to one-quarter of a tooth pitch must be avoided, in order to prevent loss of synchronism, comprising, in combination, a motor-stator and a motor-rotor having teeth adapted to lock together in synchronism, said rotor having a hub, a flywheel rotatably mounted on said rotor-hub, spring means for resiliently connecting said flywheel to said rotor, and means secured to the flywheel whereby the motor torque is delivered to a device to be turned thereby.

21. A single-phase motor of a type having teeth of identical tooth-pitches on the stator and the rotor, characterized by having a one-piece, two-pole magnetizable stator member having a multi-toothed bore for receiving the rotor, and having magnetically saturated reduced-section portions of said material at diametrically opposite sides of said bore for holding the alinement of the two polar halves of said material.

22. A single-phase motor of a type having teeth of identical tooth-pitches on the stator and the rotor, characterized by the stator comprising a single large lamination of magnetizable material having a multi-toothed bore for receiving the rotor and an opening for receiving a coil, said large lamination having material completely surrounding the bore and having magnetically saturated reduced-section portions of said material at diametrically opposite sides of said bore for holding the alinement of the two polar halves of said material, a coil disposed within the opening therefor, and a plurality of separate core-laminations passing through said coil and secured to said large lamination.

BERNARD E. LENEHAN.